United States Patent
Marupaduga et al.

(10) Patent No.: US 11,219,076 B1
(45) Date of Patent: Jan. 4, 2022

(54) BACKHAUL ACCESS NODE SELECTION

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 16/373,786

(22) Filed: Apr. 3, 2019

(51) Int. Cl.
| | | |
|---|---|---|
| *H04W 76/15* | (2018.01) | |
| *H04B 7/0426* | (2017.01) | |
| *H04W 48/06* | (2009.01) | |
| *H04W 48/16* | (2009.01) | |
| *H04B 7/155* | (2006.01) | |

(52) U.S. Cl.
CPC .......... *H04W 76/15* (2018.02); *H04B 7/0447* (2013.01); *H04B 7/155* (2013.01); *H04W 48/06* (2013.01); *H04W 48/16* (2013.01)

(58) Field of Classification Search
None
See application file for complete search history.

(56) References Cited

U.S. PATENT DOCUMENTS

| | | | | |
|---|---|---|---|---|
| 6,377,805 | B1 * | 4/2002 | Anvekar | H04W 36/08 |
| | | | | 455/11.1 |
| 9,768,983 | B2 | 9/2017 | Marzetta et al. | |
| 9,906,338 | B1 * | 2/2018 | Pawar | H04W 16/16 |
| 10,595,256 | B1 * | 3/2020 | Marupaduga | H04W 36/22 |
| 2006/0084445 | A1 * | 4/2006 | Minami | H04W 28/08 |
| | | | | 455/452.1 |
| 2006/0291417 | A1 * | 12/2006 | Aust | H05K 13/0413 |
| | | | | 370/331 |
| 2007/0115899 | A1 * | 5/2007 | Ovadia | H04W 36/24 |
| | | | | 370/338 |
| 2010/0203916 | A1 * | 8/2010 | Tiwari | H04B 7/0689 |
| | | | | 455/513 |
| 2011/0111771 | A1 * | 5/2011 | Barber | G01S 5/0205 |
| | | | | 455/456.1 |
| 2012/0082028 | A1 * | 4/2012 | Kojima | H04W 36/22 |
| | | | | 370/230 |
| 2012/0276946 | A1 * | 11/2012 | Sung | H04W 36/32 |
| | | | | 455/525 |
| 2013/0084864 | A1 * | 4/2013 | Agrawal | H04W 36/0085 |
| | | | | 455/436 |
| 2014/0248884 | A1 * | 9/2014 | Asada | H04W 36/22 |
| | | | | 455/436 |

(Continued)

*Primary Examiner* — Christopher T Wyllie

(57) ABSTRACT

One or more elements of a communication system receives a first indicator that a first wireless device is within a first coverage area of a first access node and is also within a second coverage area of a second access node. The first access node and the second access node are both configured to provide a multi-user multiple-input multiple-output (MU-MIMO) operating mode. The communication system determines a first number of wireless devices attached to the first access node that are utilizing the MU-MIMO operating mode. The communication system identifies the first wireless devices as being configured as a relay node. The communication system, based on the first number meeting a first threshold, instructs the first wireless device to attach to the second access node.

20 Claims, 8 Drawing Sheets

(56) References Cited

U.S. PATENT DOCUMENTS

| | | | |
|---|---|---|---|
| 2015/0016379 A1* | 1/2015 | Nam | H04B 7/0639 |
| | | | 370/329 |
| 2015/0162961 A1* | 6/2015 | Jalloul | H04B 7/0689 |
| | | | 370/330 |
| 2016/0156520 A1* | 6/2016 | Scully | H04L 41/0893 |
| | | | 370/254 |
| 2017/0086188 A1* | 3/2017 | Li | H04W 72/0413 |
| 2019/0296881 A1* | 9/2019 | Ang | H04W 76/15 |
| 2020/0304938 A1* | 9/2020 | Marupaduga | H04W 64/00 |

* cited by examiner

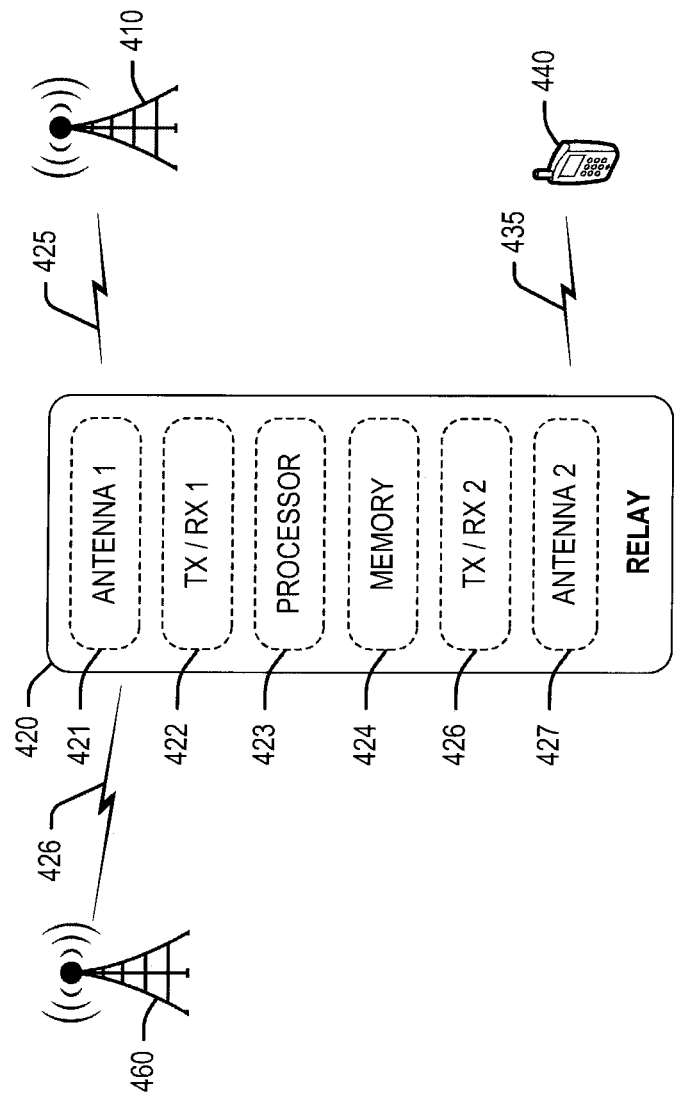

RECEIVE AN INDICATOR THAT A FIRST WIRELESS DEVICE IS WITHIN A FIRST COVERAGE AREA OF A FIRST ACCESS NODE AND IS ALSO WITHIN A SECOND COVERAGE AREA FOR A SECOND ACCESS NODE WHERE THE FIRST ACCESS NODE AND THE SECOND ACCESS NODE ARE CONFIGURED TO PROVIDE AN MU-MIMO OPERATING MODE
502

DETERMINE A FIRST NUMBER OF WIRELESS DEVICES ATTACHED TO THE FIRST ACCESS NODE THAT ARE UTILIZING THE MU-MIMO OPERATING MODE
504

DETERMINE A SECOND NUMBER OF WIRELESS DEVICES ATTACHED TO THE SECOND ACCESS NODE THAT ARE UTILIZING THE MU-MIMO OPERATING MODE
506

IDENTIFY THE FIRST WIRELESS DEVICE AS BEING CONFIGURED AS A RELAY NODE
508

BASED ON THE FIRST NUMBER MEETING A FIRST THRESHOLD, INSTRUCT THE FIRST WIRELESS DEVICE TO ATTACH TO THE SECOND ACCESS NODE
510

FIG. 5

BACKHAUL ACCESS NODE SELECTION

TECHNICAL BACKGROUND

Wireless networks incorporating access nodes, relay nodes, and other small-cell access nodes are becoming increasingly common. These may be referred to as heterogeneous networks. Relay nodes improve service quality by relaying communication between an access node, and end-user wireless devices in the wireless network. For example, relay nodes may be used at the edge of a coverage area of an access node to improve coverage and/or service. Relay nodes may also be used in crowded areas that have a high number of other wireless devices to increase the available throughput experienced by the wireless devices being relayed. Relay nodes are generally configured to communicate with the access node (i.e., a "donor" access node) via a wireless backhaul connection. Relay nodes typically deploy a radio air-interface to which end-user wireless devices can attach. Donor access nodes generally comprise scheduling modules that schedule resources used by wireless devices connected directly to the donor access node and also schedule the wireless backhaul connections for the various relay nodes connected thereto.

Wireless networks may also be configured to utilize a single-user multiple-in multiple-out (SU-MIMO) operating mode and/or a multi-user (MU-MIMO) mode. In the SU-MIMO operating mode, multiple data streams are directed towards individual wireless devices and/or relay nodes. In the MU-MIMO operating mode, the multiple data streams can be directed towards wireless devices and/or relay nodes that are selected to participate in the MU-MIMO operating mode based on the orthogonality of transmission. This helps maximize resources.

OVERVIEW

Exemplary embodiments described herein include a method of operating a communication system that includes receiving a first indicator that a first wireless device is within a first coverage area of a first access node and is also within a second coverage area of a second access node. The first access node and the second access node are both configured to provide a multi-user multiple-input multiple-output (MU-MIMO) operating mode. The method further includes determining a first number of wireless devices attached to the first access node that are utilizing the MU-MIMO operating mode. The method further includes identifying the first wireless devices as being configured as a relay node. The method further includes, based on the first number meeting a first threshold, instructing the first wireless device to attach to the second access node.

An exemplary system for allocating resources in a wireless network includes a processing node and a processor coupled to the processing node. The processor is configured to perform operations that include receiving a first indicator that a first wireless device is within a first coverage area of a first access node. The operations also include receiving a second indicator that the first wireless device is within a second coverage area of a second access node. Both the first access node and the second access node are configured to provide a multi-user multiple-input multiple-output (MU-MIMO) operating mode. The operations further include identifying the first wireless devices as being configured as a relay node. The operations further include determining a first number of wireless devices attached to the first access node that are utilizing the MU-MIMO operating mode. The operations further include, based on the first number, instructing the first wireless device to attach to the second access node.

An exemplary system includes a processing node for scheduling resources in a wireless network. The processing node is configured to perform operations that include identifying a first wireless devices as being configured as a relay node. The operations further include determining the first wireless device is within a first coverage area of a first access node configured to provide a multi-user multiple-input multiple-output (MU-MIMO) operating mode. The operations further include determining the first wireless device is within a second coverage area of a second access node configured to provide the MU-MIMO operating mode. The operations further include determining a first number of wireless devices attached to the first access node that are utilizing the MU-MIMO operating mode. The operations further include, based on the first number, instructing the first wireless device to attach to the second access node.

BRIEF DESCRIPTION OF THE DRAWINGS

FIG. 4 illustrates an example relay node.

FIG. 5 is a flowchart illustrating a method for scheduling resources in a communication system.

DETAILED DESCRIPTION

Figure 1:
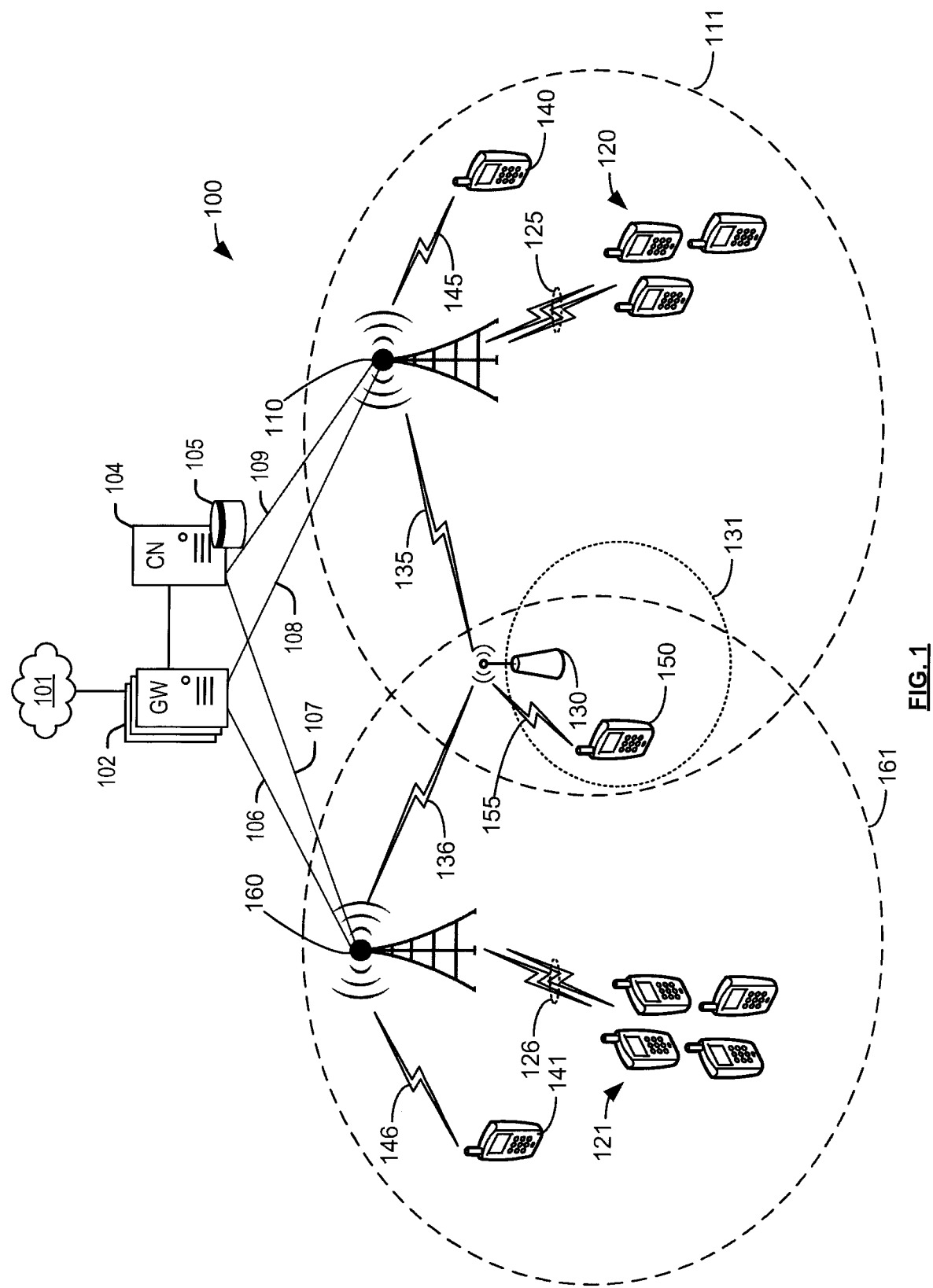
FIG. 1 is a block diagram illustrating a communication system.

In embodiments disclosed herein, a wireless network may be configured to communicate with wireless devices using a multi-user multiple-input multiple-output (MU-MIMO) operating mode. For example, a 5G system with 64+ transmit and 64+ receive antennas—a.k.a., massive MIMO or mMIMO) is capable of utilizing the MU-MIMO operating mode. The wireless network is also capable of using wireless devices that are configured as relay nodes. When a relay node is positioned such that it may attach to two (or more) access nodes (i.e., it is within the cover area of two or more access nodes that may be operating on, for example, different frequency bands), and there is a minimum MU-MIMO load on both access nodes, the relay node is instructed to attach to access node that has a fewer number of active MU-MIMO pairings. This helps reduce congestion on the non-selected access node. This, in turn, helps improve the performance of the end-user devices that are part of a MU-MIMO pairing on the non-selected access node.

In embodiments described herein, a method of operating a communication system includes receiving a first indicator that a first wireless device may attach to a first access node and also may attach to a second access node. The first access node and the second access node are both configured to provide a multi-user multiple-input multiple-output (MU-MIMO) operating mode. The method further includes determining a first number of wireless devices attached to the first access node that are utilizing the MU-MIMO operating mode. The method further includes identifying the first wireless device as being configured as a relay node. The method further includes, based on the first number meeting a first threshold, instructing the first wireless device to attach to the second access node.

In addition, a second number of wireless devices attached to the second access node that are utilizing the MU-MIMO operating mode may be determined. The first threshold may be determined based on the second number. It may also be determined that the first number of wireless devices attached to the first access node that are utilizing the MU-MIMO operating mode has changed to a third number of wireless devices attached to the first access node that are utilizing the MU-MIMO operating mode. The third number may not meet the first threshold. Based on the third number not meeting the first threshold, the first wireless device may be instructed to attach to the first access node. It may be determined that the second number of wireless devices attached to the second access node that are utilizing the MU-MIMO operating mode has changed to a fourth number of wireless devices attached to the second access node that are utilizing the MU-MIMO operating mode. The first threshold may be determined (or re-determined) based on the fourth number.

In another exemplary embodiment, a system for allocating resources in a wireless network includes a processing node and a processor coupled to the processing node. The processor is configured to perform operations that include receiving a first indicator that a first wireless device is within a first coverage area of a first access node. The operations also include receiving a second indicator that the first wireless device is within a second coverage area of a second access node. Both the first access node and the second access node are configured to provide a multi-user multiple-input multiple-output (MU-MIMO) operating mode. The operations further include identifying the first wireless devices as being configured as a relay node. The operations further include determining a first number of wireless devices attached to the first access node that are utilizing the MU-MIMO operating mode. The operations further include, based on the first number, instructing the first wireless device to attach to the second access node.

In addition, the processor may be further configured to determine a second number of wireless devices attached to the second access node that are utilizing the MU-MIMO operating mode. Instructing the first wireless device to attach to the second access node may be further based on the second number. Instructing the first wireless device to attach to the second access node may be based on the first number exceeding the second number by at least a first amount. The processor may be further configured to determine that the first number of wireless devices attached to the first access node that are utilizing the MU-MIMO operating mode has changed to a third number of wireless devices attached to the first access node that are utilizing the MU-MIMO operating mode. The third number may not exceed the second number by the first amount. The processor may further configured to, based on the third number not exceeding the second number by the first amount, instruct the first wireless device to attach to the first access node.

The processor may be configured to determine that the second number of wireless devices attached to the second access node that are utilizing the MU-MIMO operating mode has changed to a fourth number of wireless devices attached to the second access node that are utilizing the MU-MIMO operating mode, where the fourth number exceeds the first number by at least the first amount. Based on the fourth number exceeding the first number by at least the first amount, the first wireless device may be instructed to attach to the first access node.

In another exemplary embodiment, a system includes a processing node for scheduling resources in a wireless network. The processing node is configured to perform operations that include identifying a first wireless devices as being configured as a relay node. The operations further include determining the first wireless device is within a first coverage area of a first access node configured to provide a multi-user multiple-input multiple-output (MU-MIMO) operating mode. The operations further include determining the first wireless device is within a second coverage area of a second access node configured to provide the MU-MIMO operating mode. The operations further include determining a first number of wireless devices attached to the first access node that are utilizing the MU-MIMO operating mode. The operations further include, based on the first number, instructing the first wireless device to attach to the second access node.

In addition, the processing node may be further configured to perform operations that include determining a second number of wireless devices attached to the second access node that are utilizing the MU-MIMO operating mode. Instructing the first wireless device to attach to the second access node may be further based on the second number. The processing node may be further configured to determine that the first number of wireless devices attached to the first access node that are utilizing the MU-MIMO operating mode has changed to a third number of wireless devices attached to the first access node that are utilizing the MU-MIMO operating mode, where the third number exceeds the second number by at least a first amount. The processing node may be further configured to, based on the third number exceeding the first number by at least the first amount, instruct the first wireless device to attach to the first access node.

The processing node may be configured to determine that the second number of wireless devices attached to the second access node that are utilizing the MU-MIMO operating mode has changed to a fourth number of wireless devices attached to the second access node that are utilizing the MU-MIMO operating mode, where the fourth number does not exceed the first number by at least the first amount. The processing node may be further configured to, based on the fourth number not exceeding the first number by at least the first amount, instruct the first wireless device to attach to the first access node.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

These and additional operations are further described with respect to the embodiments depicted in FIGS. 1-7.

FIG. 1 is a block diagram illustrating a communication system. System 100 comprises a communication network 101, gateway node(s) 102, controller node 104, access node 110, access node 160, relay node 130, wireless devices 120, 121, 140, 141, and 150. Access node 110 is illustrated as deploying a wireless air interface coverage area 111 (a.k.a., a sector). Access node 160 is illustrated as deploying a wireless air interface coverage area 161. In an embodiment, access node 110 and access node 160 may be co-located. In this case, coverage area 111 and coverage area 161 may be substantially the same.

Relay node 130 and wireless devices 120, 140, and 150 are located within coverage area 111 and may access network services via access node 110. Relay node 130 and wireless devices 121, 141, and 150 are located within coverage area 161 and may access network services via access node 160.

End-user wireless device 140 is operatively coupled to access node 110 via air-interface link 145. End-user wireless devices 120 are operatively coupled to access node 110 via MU-MIMO paired links 125. End-user wireless device 141 is operatively coupled to access node 160 via air-interface link 146. End-user wireless devices 121 are operatively coupled to access node 160 via MU-MIMO paired links 126. The number of MU-MIMO pairings communicating with access node 110 is less than the number of MU-MIMO pairings communicating with access node 160. This is illustrated in FIG. 1 by the number of wireless devices 120 shown communicating via MU-MIMO links 125 being less than the number of wireless devices 121 communicating via MU-MIMO links 126.

Relay node 130 may be configured to communicate with access node 110 over communication link 135, (hereinafter, "wireless backhaul" or simply "backhaul"). Relay node 130 may be configured to communicate with access node 160 over communication link 136. Relay node 130 is further configured to deploy additional wireless air interfaces over coverage area 131. Wireless device 150 is configured to attach to the wireless air interface of relay node 130. Wireless device 150 may access network services from access node 110 (via link 135) or access node 160 (via link 135) by virtue of being connected to relay node 130. Consequently, access nodes 110 and 160 may be termed a "donor" access nodes. In other embodiments, any other combination of wireless devices, donor access nodes, relay access nodes, and carriers deployed therefrom may be evident to those having ordinary skill in the art in light of this disclosure.

In operation, control node 104 (or another entity within system 100) may be configured to execute a method of operating a communication system that includes receiving a first indicator that a first wireless device (e.g., relay node 130) may attach to a first access node (e.g., access node 160) and also may attach to a second access node (e.g., access node 110.) The first access node and the second access node are both configured to provide a multi-user multiple-input multiple-output (MU-MIMO) operating mode. The method further includes determining a first number of wireless devices attached to the first access node that are utilizing the MU-MIMO operating mode (e.g., the number of wireless devices 121 communicating via MU-MIMO links 126.) The method further includes identifying the first wireless device as being configured as a relay node. The method further includes, based on the first number meeting a first threshold (e.g., the number of wireless devices 121 communicating via MU-MIMO links 126 being greater than a selected number—e.g., 10, 20, 30, etc. wireless devices), instructing the first wireless device to attach to the second access node.

In addition, a second number of wireless devices attached to the second access node that are utilizing the MU-MIMO operating mode may be determined (e.g., the number of wireless devices 120 communicating via MU-MIMO links 125.). The first threshold may be determined based on the second number. For example, the first threshold may be equal to the second number; the first threshold may be 120% of the second number; the first threshold may be the second number plus 10 devices, etc.

It may also be determined that the first number of wireless devices attached to the first access node that are utilizing the MU-MIMO operating mode has changed to a third number of wireless devices attached to the first access node that are utilizing the MU-MIMO operating mode. For example, the number of wireless devices 121 utilizing MU-MIMO links 126 may drop (or rise) over time. The third number may not meet the first threshold. For example, the number of wireless devices 121 utilizing MU-MIMO links 126 with access node 160 may drop from being greater than the number of wireless devices 120 utilizing MU-MIMO links 125 with access node 110, to being below the number of wireless devices 120 utilizing MU-MIMO links 125 with access node 110.

Based on the third number not meeting the first threshold, the first wireless device may be instructed to attach to the first access node. For example, in response to the number of wireless devices 121 utilizing MU-MIMO links 126 with access node 160 dropping from being greater than the number of wireless devices 120 utilizing MU-MIMO links 125 with access node 110 to being below the number of wireless devices 120 utilizing MU-MIMO links 125 with access node 110, relay node 130 may be instructed to attach to access node 160.

It may be determined that the second number of wireless devices attached to the second access node that are utilizing the MU-MIMO operating mode has changed to a fourth number of wireless devices attached to the second access node that are utilizing the MU-MIMO operating mode. For example, the number of wireless devices 120 utilizing MU-MIMO links 125 may rise (or drop) over time. The changed number may cause a change in the first threshold. For example, the number of wireless devices 120 utilizing MU-MIMO links 125 with access node 110 may rise from being less than the number of wireless devices 121 utilizing MU-MIMO links 126 with access node 160, to being above the number of wireless devices 121 utilizing MU-MIMO links 126 with access node 160. In response, the first threshold may be determined (or re-determined) based on the changed number of devices 120 utilizing MU-MIMO links 125 with access node 110.

Access node 110 and/or access node 160 can be any network node configured to utilize MU-MIMO and to provide communication between relay node 130, wireless devices 120, 121, 140, 141, 150 and communication network 101, including standard access nodes and/or short range, low power, small access nodes. For instance, access node 110 and/or access node 160 may include any standard access node, such as a macrocell access node, base transceiver station, a radio base station, an eNodeB device, an enhanced eNodeB device, a next generation or gigabit NodeB device (gNBs) in 5G networks, or the like. By virtue of comprising a plurality of antennae as further described herein, access node 110 and/or access node 160 can deploy or implement multiple-input-multiple-output (MIMO) modes, such as single user MIMO (SU-MIMO), or multi-user MIMO (MU-MIMO) modes. In an exemplary embodiment, access node 110 and/or access node 160 may utilize hundreds of antennae to simultaneously transmit each of a plurality of different data streams (such as MU-MIMO data stream 125) to a corresponding plurality of wireless devices (such as wireless devices 120). Moreover, it is noted that while access node 110 and access node 160 are illustrated in FIG. 1, any number of access nodes can be implemented within system 100.

Relay node 130 may comprise any short range, low power, small-cell access nodes such as a microcell access node, a picocell access node, a femtocell access node, or a home eNodeB device. In addition, relay node 130 may comprise a small-cell access node paired with a relay wireless device configured to communicate over backhaul 135.

Access node 110, access node 160, and relay node 130 can each comprise a processor and associated circuitry to execute or direct the execution of computer-readable instructions to perform operations such as those further described herein. Briefly, access node 110, access node 160, and relay node 130 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110, access node 160, and relay node 130 can receive instructions and other input at a user interface. Access node 110 communicates with gateway node 102 and controller node 104 via communication links 108, 109. Access node 160 communicates with gateway node 102 and controller node 104 via communication links 106, 107. Access node 110, access node 160, and relay node 130 may communicate with each other, and other access nodes (not shown), using a wireless link or a wired link such as an X2 link. Components of exemplary access nodes 110, access node 160, and relay node 130 are further described with reference to FIGS. 2-4.

Wireless devices 120, 121, 140, 141, 150, may be any device, system, combination of devices, or other such communication platform capable of communicating wirelessly with access node 110, access node 160, and/or relay node 130 using one or more frequency bands deployed therefrom. Each of wireless devices 120, 121, 140, 141, 150, may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 121, 140, 141, 150. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106-109 can use various communication media, such as air, space, metal, optical fiber, or some other signal propagation path—including combinations thereof. Communication links 106-109 can be wired or wireless and use various communication protocols such as Internet, Internet protocol (IP), local-area network (LAN), optical networking, hybrid fiber coax (HFC), telephony, Ti, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106-109 may include Si communication links. Other wireless protocols can also be used. Communication links 106-109 can be a direct link or might include various equipment, intermediate components, systems, and networks. Communication links 106-109 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as configurations and capabilities of relay node 130, resource requirements of end-user wireless devices 120, 121, 140, 141, 150, and relay node 130, priority levels associated therewith, and so on. This information may be requested by or shared with access node 110 and/or access node 160 via communication links 106-109, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements (e.g. between access node 110 and communication network 101.)

In another exemplary embodiment, a processing node coupled to a network entity in system 100 can be configured to perform operations that include receiving a first indicator that wireless device 130 is within a coverage area 161 of access node 160. As a result of wireless device 130 being within coverage area 161 of access node 160, wireless device 130 may attach to access node 160. The operations also include receiving a second indicator that wireless device 130 is also within a coverage area 111 of access node 110. As a result of wireless device 130 being within coverage area 111 of access node 110, wireless device 130 may attach to access node 110. Both the access node 160 and the second access node 110 are configured to provide a multi-user multiple-input multiple-output (MU-MIMO) operating mode. The operations further include identifying wireless device 130 as being configured as a relay node. The operations further include determining a first number of wireless devices 121 attached to the access node 160 that are utilizing the MU-MIMO operating mode. The operations further include, based on the first number, instructing the wireless device 130 to attach to the access node 110. For example, based on the number wireless devices 121 attached to the access node 160 that are utilizing the MU-MIMO operating mode exceeding a selected threshold, wireless device 130 may be instructed to attach to access node 110.

In addition, the processor may be further configured to determine a second number of wireless devices 120 attached to access node 110 that are utilizing the MU-MIMO operating mode. Instructing wireless device 130 to attach to access node 110 may be further based on this second number. For example, in response to the number wireless devices 120 attached to the access node 110 that are utilizing the MU-MIMO operating mode being less than the number wireless devices 121 attached to the access node 160 that are utilizing the MU-MIMO operating mode, wireless device 130 may be instructed to attach to access node 110. In another example, the instruction to attach to access node 110 may be based on the first number exceeding the second number by at least a first amount (e.g., 5%, 10%, 5 devices, 10 devices, etc.)

The processor may be further configured to determine that the first number of wireless devices 121 attached to access node 160 that are utilizing the MU-MIMO operating mode has changed to a third number. The third number fails to exceed the second number by the first amount. The processor may further configured to, based on the third number not exceeding the second number by the first amount, instruct wireless device 130 to attach to access node 160.

The processor may be configured to determine that the second number of wireless devices 120 attached to the access node 110 that are utilizing the MU-MIMO operating mode has changed to a fourth number, where the fourth number exceeds the first number by at least the first amount. Based on the fourth number exceeding the first number by at least the first amount, wireless device 130 may be instructed to attach to the access node 160.

In another exemplary embodiment, a processing node coupled to a network entity in system 100 can be configured to perform operations that include identifying a wireless device 130 as being configured as a relay node. The operations further include determining wireless device 130 is within a coverage area 161 of access node 160 and may therefore attach to, and communicate with access node 160, where access node 160 is configured to provide a multi-user multiple-input multiple-output (MU-MIMO) operating mode. The operations further include determining wireless device 130 is within coverage area 111 of access node 110 and may therefore attach to, and communicate with access node 110, where access node 110 is configured to provide the MU-MIMO operating mode. The operations further include determining a first number of wireless devices 121 attached to the access node 160 are utilizing the MU-MIMO operating mode. The operations further include, based on the first number, instructing wireless device 130 to attach to access node 110. For example, based on the number wireless devices 121 attached to the access node 160 that are utilizing the MU-MIMO operating mode exceeding a selected threshold, wireless device 130 may be instructed to attach to access node 110.

In addition, the processing node may be further configured to perform operations that include determining a second number of wireless devices 120 attached to access node 110 that are utilizing the MU-MIMO operating mode. Instructing wireless device 130 to attach to access node 110 may be further based on the second number. For example, in response to the number wireless devices 120 attached to the access node 110 that are utilizing the MU-MIMO operating mode being less than the number wireless devices 121 attached to the access node 160 that are utilizing the MU-MIMO operating mode, wireless device 130 may be instructed to attach to access node 110. In another example, the instruction to attach to access node 110 may be based on the first number exceeding the second number by at least a first amount (e.g., 5%, 10%, etc.)

The processing node may be further configured to determine that the number of wireless devices 121 attached to the access node 160 that are utilizing the MU-MIMO operating mode has changed to a third number, where the third number exceeds the second number by at least a first amount (e.g., 5%, 10%, etc.). The processing node may be further configured to, based on the third number exceeding the first number by at least the first amount, instruct wireless device 130 to attach to the access node 160.

The processing node may be configured to determine that the number of wireless devices 120 attached to access node 110 that are utilizing the MU-MIMO operating mode has changed to a fourth number, where the fourth number does not exceed the first number by at least the first amount. The processing node may be further configured to, based on the fourth number not exceeding the first number by at least the first amount, instruct the wireless device 130 to attach to the access node 110.

Figure 2:
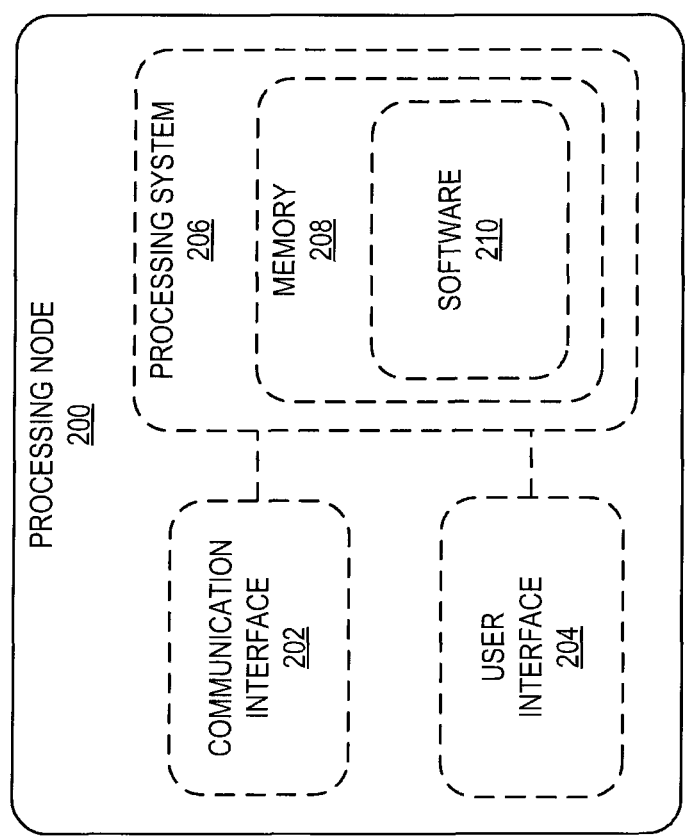
FIG. 2 illustrates an example processing node for instructing wireless devices and relay nodes in wireless networks.

FIG. 2 illustrates an example processing node for instructing wireless devices and relay nodes in wireless networks. In FIG. 2, processing node 200 comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a coherence determination module. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
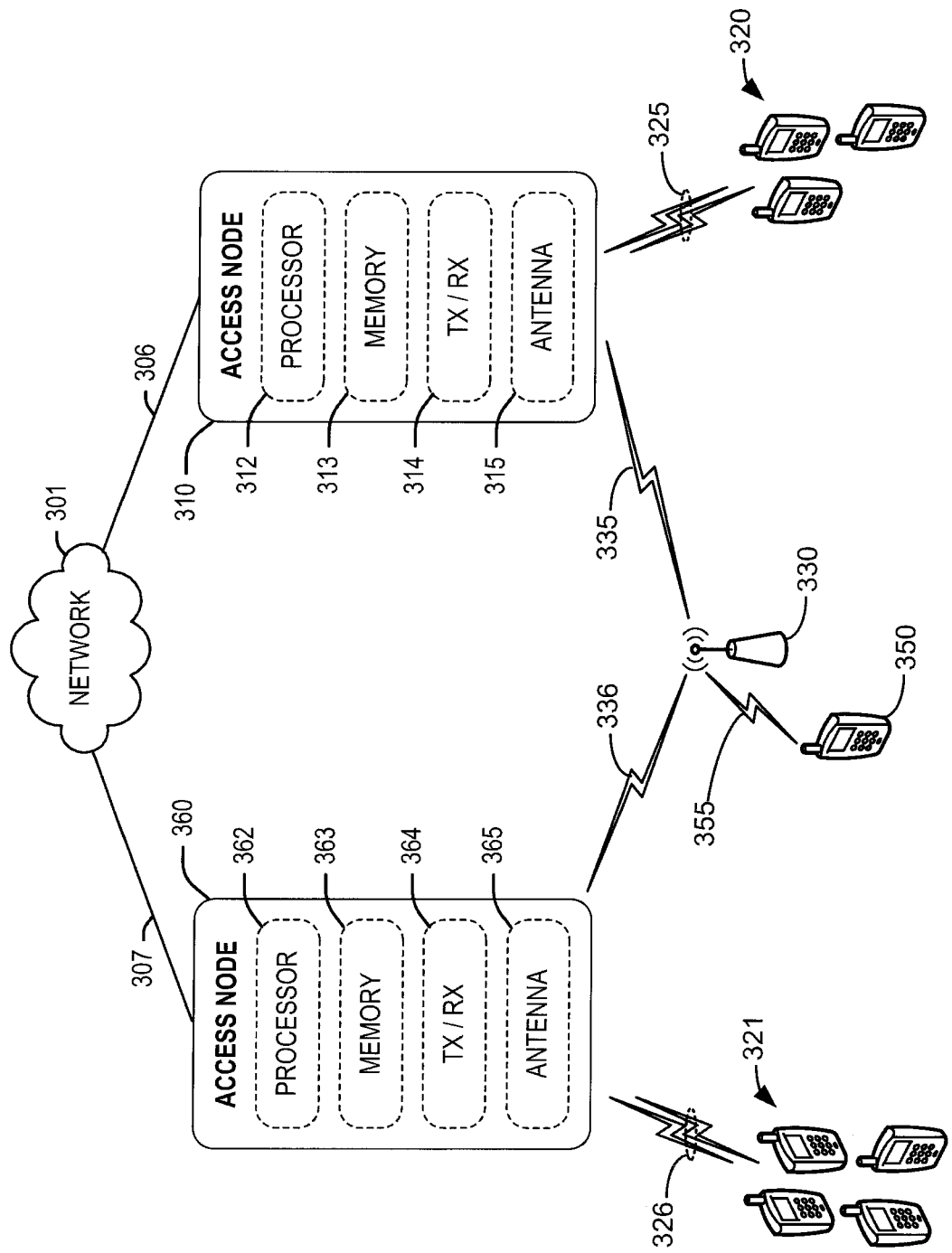
FIG. 3 illustrates an example communication system configured to utilize MU-MIMO and communicate with a relay node.

FIG. 3 illustrates an example communication system configured to utilize MU-MIMO and communicate with a relay node. Communication system 300 comprises network 301, access node 310, access node 360, end-user wireless devices 320, 321, 350, and relay node 330. Access node 310 may comprise, for example, a macro-cell access node, that is configured to utilize the MU-MIMO mode of operation, such as access node 110 described with reference to FIG. 1. Access node 360 may comprise, for example, a macro-cell access node, that is not configured to utilize the MU-MIMO mode of operation, such as access node 160 described with reference to FIG. 1.

Access node 310 is illustrated as comprising a processor 312, memory 313, transceiver 314, and antenna 315. Processor 312 executes instructions stored on memory 313, while transceiver 314 and antenna 315 enable wireless communication with wireless devices 320 and relay node 330. Instructions stored on memory 313 can include deploying a wireless air interface via combination of transceiver 314 and antenna 315, enabling wireless devices 320 and (optionally) relay node 330 to access network services from network 301 via access node 310. Access node 310 may be configured to communicate with end-user wireless device 350 via relay node 330. Thus, access node 310 may be referred to as a donor access node.

Access node 360 is illustrated as comprising a processor 362, memory 363, transceiver 364, and antenna 365. Processor 362 executes instructions stored on memory 363, while transceiver 364 and antenna 365 enable wireless communication with wireless devices 320 and relay node 330. Instructions stored on memory 313 can include deploying a wireless air interface via combination of transceiver 314 and antenna 315, enabling wireless devices 320 and (optionally) relay node 330 to access network services from network 301 via access node 360. Access node 360 may be configured to communicate with end-user wireless device 350 via relay node 330. Thus, access node 310 may be referred to as a donor access node.

Access node 360 is illustrated as comprising a processor 362, memory 363, transceiver 364, and antenna 365. Processor 362 executes instructions stored on memory 363, while transceiver 364 and antenna 365 enable wireless communication with wireless devices 320 and relay node 330. Instructions stored on memory 313 can include deploying a wireless air interface via combination of transceiver 314 and antenna 315, enabling wireless devices 320 and (optionally) relay node 330 to access network services from network 301 via access node 360. Access node 360 may be configured to communicate with end-user wireless device 350 via relay node 330. Thus, access node 310 may be referred to as a donor access node.

Access node 310, access node 360, or another element of communication system 300, may be configured to identify relay node 330 as being connected thereto, determine a configuration thereof, and schedule resources towards backhauls 335 and 336 based thereon. For example, one or more elements of communication system 300 may receive a first indicator that relay node 330 is within a coverage area of access node 360 and is also within a coverage area of access node 310. Access node 360 and access node 310 are both configured to provide a multi-user multiple-input multiple-output (MU-MIMO) operating mode. One or more elements of communication system 300 may determine a first number of wireless devices 321 attached to access node 360 are utilizing the MU-MIMO operating mode (e.g., the number of wireless devices 321 communicating via MU-MIMO links 326.) One or more elements of communication system 300 may identify wireless device 330 as being configured as a relay node. One or more elements of communication system 300 may, based on the first number meeting a first threshold (e.g., the number of wireless devices 321 communicating via MU-MIMO links 326 being greater than a selected number—e.g., 10, 20, 30, etc. wireless devices), instruct wireless device 330 to attach to access node 310.

In addition, one or more elements of communication system 300 may determine a second number of wireless devices 320 attached to access node 310 that are utilizing the MU-MIMO operating mode may be determined (e.g., the number of wireless devices 320 communicating via MU-MIMO links 325.). The first threshold may be determined based on the second number. For example, the first threshold may be equal to the second number; the first threshold may be 120% of the second number; the first threshold may be the second number plus 10 devices, etc.

One or more elements of communication system 300 may determine that the first number of wireless devices 321 attached to the access node 360 that are utilizing the MU-MIMO operating mode has changed to a third number. For example, the number of wireless devices 321 utilizing MU-MIMO links 326 may drop (or rise) over time. The third number may not meet the first threshold. For example, the number of wireless devices 321 utilizing MU-MIMO links 326 with access node 360 may drop from being greater than the number of wireless devices 320 utilizing MU-MIMO links 325 with access node 310 to being below the number of wireless devices 320 utilizing MU-MIMO links 325 with access node 310.

Based on the third number not meeting the first threshold, the wireless device 330 may be instructed to attach to the access node 360. For example, in response to the number of wireless devices 321 utilizing MU-MIMO links 326 with access node 360 dropping from being greater than the number of wireless devices 320 utilizing MU-MIMO links 325 with access node 310 to being below the number of wireless devices 320 utilizing MU-MIMO links 325 with access node 310, relay node 330 may be instructed to attach to access node 310.

One or more elements of communication system 300 may determine that the second number of wireless devices 320 attached to second access node 310 that are utilizing the MU-MIMO operating mode has changed to a fourth number of wireless devices. For example, the number of wireless devices 320 utilizing MU-MIMO links 325 may rise (or drop) over time. The changed number may cause a change in the first threshold. For example, the number of wireless devices 320 utilizing MU-MIMO links 325 with access node 310 may rise from being less than the number of wireless devices 321 utilizing MU-MIMO links 326 with access node 360 to being above the number of wireless devices 321 utilizing MU-MIMO links 326 with access node 360. In response, the first threshold may be determined (or re-determined) based on the changed number of devices 320 utilizing MU-MIMO links 325 with access node 310.

In another exemplary embodiment, one or more elements of communication system 300 may receive a first indicator that wireless device 330 is within a coverage area of access node 360. One or more elements of communication system 300 may receive a second indicator that wireless device 330 is also within a coverage area of access node 310. Both the access node 360 and the second access node 310 are configured to provide a multi-user multiple-input multiple-output (MU-MIMO) operating mode. One or more elements of communication system 300 may identify wireless device 330 as being configured as a relay node. One or more elements of communication system 300 may determine a first number of wireless devices 321 attached to the access node 360 that are utilizing the MU-MIMO operating mode. One or more elements of communication system 300 may, based on the first number, instruct wireless device 330 to attach to the access node 310. For example, based on the number wireless devices 321 attached to the access node 360 that are utilizing the MU-MIMO operating mode exceeding a selected threshold, wireless device 330 may be instructed to attach to access node 310.

In addition, one or more elements of communication system 300 may determine a second number of wireless devices 320 attached to the access node 310 that are utilizing the MU-MIMO operating mode. The instruction of wireless device 330 to attach to access node 310 may be further based on this second number. For example, in response to the number wireless devices 320 attached to the access node 310 that are utilizing the MU-MIMO operating mode being less than the number wireless devices 321 attached to the access node 360 that are utilizing the MU-MIMO operating mode, wireless device 330 may be instructed to attach to access node 310. In another example, the instruction to attach to access node 310 may be based on the first number exceeding the second number by at least a first amount (e.g., 5 devices, 30 devices, etc.)

One or more elements of communication system 300 may determine that the first number of wireless devices 321 attached to access node 360 that are utilizing the MU-MIMO operating mode has changed to a third number. The third number may not exceed the second number by the first amount. One or more elements of communication system 300 may, based on the third number not exceeding the second number by the first amount, instruct wireless device 330 to attach to access node 360.

One or more elements of communication system 300 may determine that the second number of wireless devices 320 attached to the access node 310 that are utilizing the MU-MIMO operating mode has changed to a fourth number, where the fourth number exceeds the first number by at least the first amount. Based on the fourth number exceeding the first number by at least the first amount, one or more elements of communication system 300 may instruct wireless device 330 to attach to access node 360.

In another exemplary embodiment, one or more elements of communication system 300 may identify a wireless device 330 as being configured as a relay node. One or more elements of communication system 300 may determine wireless device 330 is within a coverage area 361 of access node 360, where access node 360 is configured to provide a multi-user multiple-input multiple-output (MU-MIMO) operating mode. One or more elements of communication system 300 may determine wireless device 330 is within a coverage area of access node 310, where access node 310 is configured to provide the MU-MIMO operating mode. One or more elements of communication system 300 may determine a first number of wireless devices 321 attached to access node 360 are utilizing the MU-MIMO operating mode. One or more elements of communication system 300 may, based on the first number, instruct wireless device 330 to attach to access node 310. For example, based on the number wireless devices 321 attached to the access node 360 that are utilizing the MU-MIMO operating mode exceeding a selected threshold, wireless device 330 may be instructed to attach to access node 310.

In addition, one or more elements of communication system 300 may determine a second number of wireless devices 320 attached to access node 310 that are utilizing the MU-MIMO operating mode. Instructing wireless device 330 to attach to access node 310 may be further based on the second number. For example, in response to the number wireless devices 320 attached to the access node 310 that are utilizing the MU-MIMO operating mode being less than the number wireless devices 321 attached to the access node 360 that are utilizing the MU-MIMO operating mode, wireless device 330 may be instructed to attach to access node 310. In another example, the instruction to attach to access node 310 may be based on the first number exceeding the second number by at least a first amount (e.g., 5%, 30%, etc.)

One or more elements of communication system 300 may determine that the number of wireless devices 321 attached to the access node 360 that are utilizing the MU-MIMO operating mode has changed to a third number, where the third number exceeds the second number by at least a first amount (e.g., 5%, 30%, etc.). One or more elements of communication system 300, based on the third number exceeding the first number by at least the first amount, instruct wireless device 330 to attach to the access node 360.

One or more elements of communication system 300 may determine that the number of wireless devices 320 attached to access node 310 that are utilizing the MU-MIMO operating mode has changed to a fourth number, where the fourth number does not exceed the first number by at least the first amount. One or more elements of communication system 300 may, based on the fourth number not exceeding the first number by at least the first amount, instruct the wireless device 330 to attach to the access node 310.

FIG. 4 illustrates an example relay node. In FIG. 4, relay node 430 comprises a first antenna 431, first transceiver 432, processor 433, memory 434, second transceiver 436, and a second antenna 437. Memory 434 may be used for storing instructions that are executed by processor 433. Transceiver 432 and antenna 431 may be used for direct (i.e. unrelayed) communication with donor access node 410 or donor access node 460 via wireless backhaul link 435 and 436, respectively. Relay node 430 includes transceiver 436 and antenna 437 for enabling communication with wireless device 450 via link 455 thereby enabling wireless device 450 to attach thereto. When relay node 430 is attached to access node 410 or access node 460, and wireless device 450 is attached to relay node 430, communication system 400 is formed.

Relay node 430 may be configured to identify itself as a relay node to access node 410 and/or access node 460. Relay node may be configured to receive instructions and resource allocations from access node 410 and/or access node 460. For example, access node 410 and/or access node 460 may configure relay node 430 to determine whether or not relay node 430 is to attach to access node 460 and therefore not utilize MU-MIMO on backhaul 436. Access node 410 and/or access node 460 may configure relay node 430 to determine whether or not relay node 430 is to attach to access node 410 and therefore may utilize MU-MIMO on backhaul 435. Access node 410 and/or access node 460 may configure relay node 430 as to whether or not backhaul 435 is allowed to use MU-MIMO. Relay node 430 may report or otherwise communicate to access node 410 and/or access node 460 the number of devices attached to relay node 430. Relay node 430 may report or otherwise communicate, to access node 410 and/or access node 460, one or more signal strength(s) and/or other quality of service indicators associated with the devices (e.g., wireless device 450) attached to relay node 430.

FIG. 5 is a flowchart illustrating a method for scheduling resources in a communication system. The steps illustrated in FIG. 5 may be performed by one or more elements of system 100, processing node 200, system 300, system 400, and/or their components. An indicator that a first wireless device is within a first coverage area of a first access node and is also within a second coverage area for a second access node is received, where the first access node and the second access node are configured to provide an MU-MIMO operating mode (502). For example, one or more elements of communication system 100 may receive a first indicator that relay node 130 is within a coverage area 161 of access node 160 and is also within a coverage area 111 of access node 110.

A first number of wireless devices attached to the first access node that are utilizing the MU-MIMO operating mode is determined (504). For example, one or more elements of communication system 100 may determine that a first number of wireless devices 121 attached to access node 160 are utilizing the MU-MIMO operating mode. A second number of wireless devices attached to the second access node that are utilizing the MU-MIMO operating mode is determined (506). For example, one or more elements of communication system 100 may determine that a second number of wireless devices 120 attached to access node 110 are utilizing the MU-MIMO operating mode.

The first wireless device is identified as being configured as a relay node (508). For example, one or more elements of communication system 100 may identify wireless device 130 as being configured as a relay node. Based on the first number meeting a first threshold, the first wireless device is instructed to attach to the second access node (510). For example, one or more elements of communication system 100 may, based on the first number meeting a first threshold (e.g., the number of wireless devices 121 communicating via MU-MIMO links 126 being greater than a selected number—e.g., 10, 20, 30, etc. wireless devices), instruct wireless device 130 to attach to access node 110.

Figure 6:
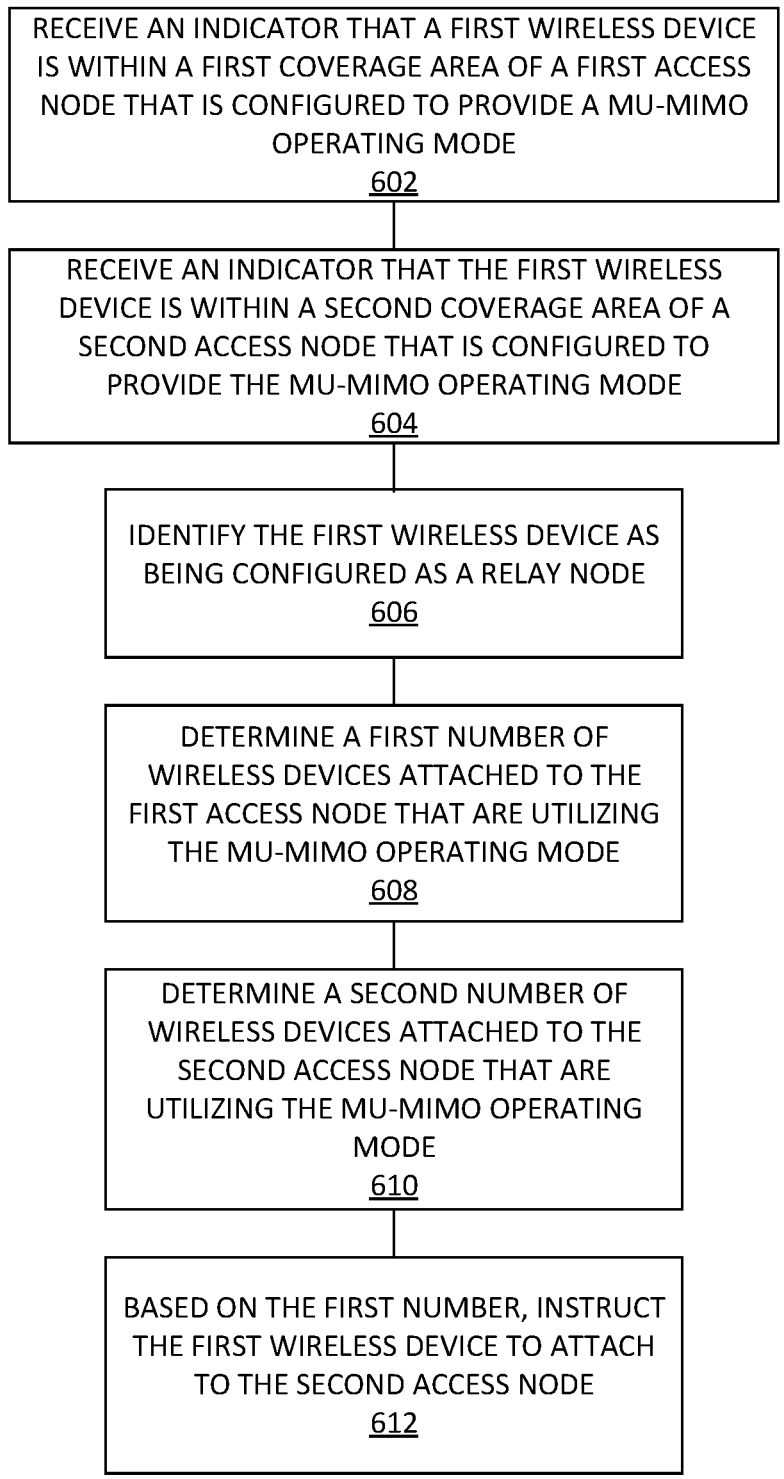
FIG. 6 is a flowchart illustrating a method for selecting an access node to service a wireless device.

FIG. 6 is a flowchart illustrating a method for selecting an access node to service a wireless device. The steps illustrated in FIG. 6 may be performed by one or more elements of system 100, processing node 200, system 300, system 400, and/or their components. An indicator that a first wireless device is within a first coverage area of a first access node that is configured to provide a MU-MIMO operating mode is received (602). For example, one or more elements of communication system 100 may receive a first indicator that wireless device 130 is within a coverage area 161 of access node 160.

An indicator that the first wireless device is within a second coverage area of a second access node that is configured to provide the MU-MIMO operating mode is received (604). For example, one or more elements of communication system 100 may receive a second indicator that wireless device 130 is also within a coverage area 111 of access node 110. The first wireless device is identified as being configured as a relay node (606). For example, one or more elements of communication system 100 may identify wireless device 130 as being configured as a relay node.

A first number of wireless devices attached to the first access node that are utilizing the MU-MIMO operating mode is determined (608). For example, one or more elements of communication system 100 may determine that a first number of wireless devices 121 attached to the access node 160 are utilizing the MU-MIMO operating mode. A second number of wireless devices attached to the second access node that are utilizing the MU-MIMO operating mode is determined (610). For example, one or more elements of communication system 100 may determine that a first number of wireless devices 120 attached to the access node 110 are utilizing the MU-MIMO operating mode.

Based on the first number, the first wireless device is instructed to attach to the second access node (612). For example, one or more elements of communication system 100 may, based on the first number, instruct wireless device 130 to attach to the access node 110. In another example, based on the number wireless devices 121 attached to the access node 160 that are utilizing the MU-MIMO operating mode exceeding a selected threshold (or the number of wireless devices 120 utilizing MU-MIMO with access node 110), wireless device 130 may be instructed to attach to access node 110.

Figure 7:
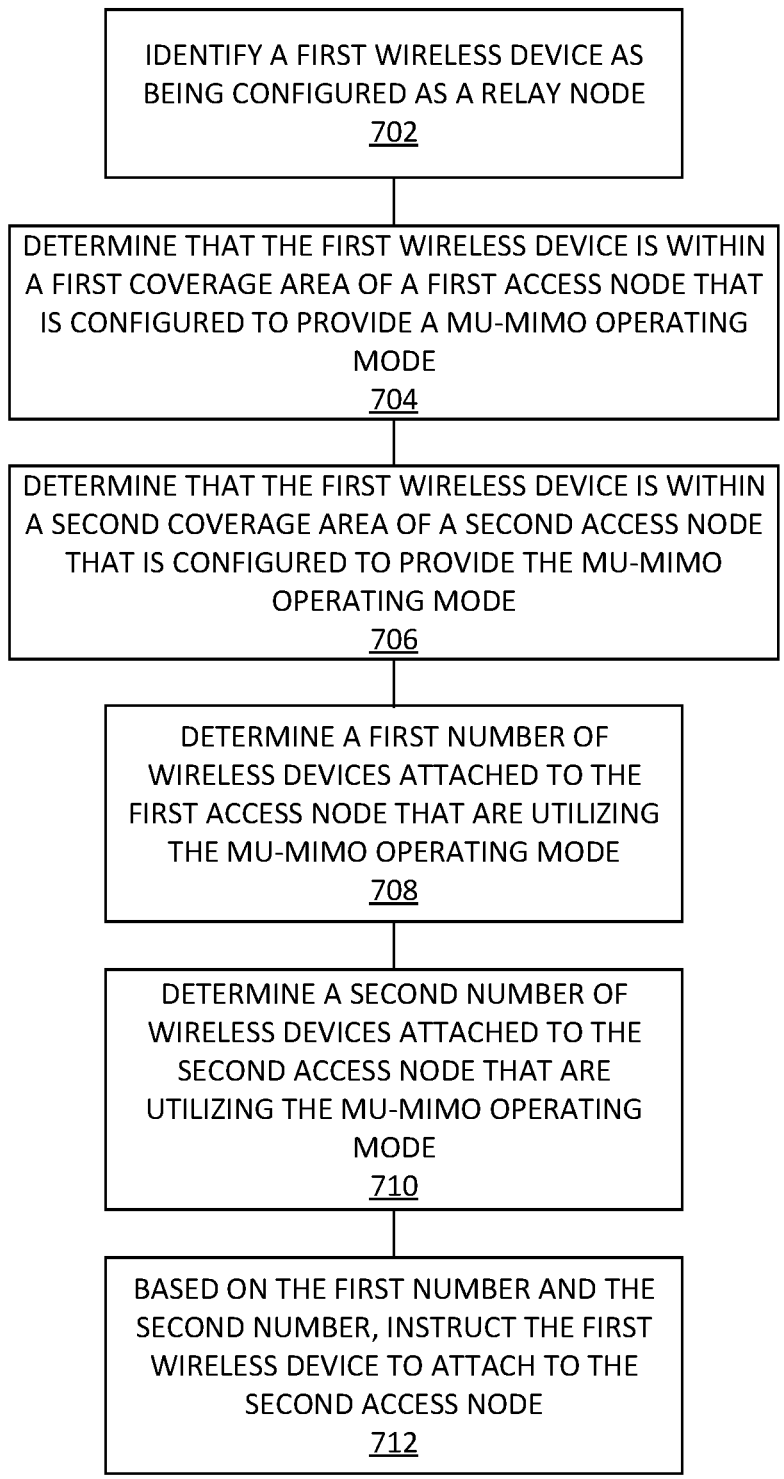
FIG. 7 is a flowchart illustrating a method of controlling a relay node.

FIG. 7 is a flowchart illustrating a method for selecting an access node to service a wireless device. The steps illustrated in FIG. 7 may be performed by one or more elements of system 100, processing node 200, system 300, system 400, and/or their components. A first wireless device is identified as being configured as a relay node (702). For example, one or more elements of communication system 100 may identify a wireless device 130 as being configured as a relay node.

It is determined that the first wireless device is within a first coverage area of a first access node that is configured to provide a MU-MIMO operating mode (704). For example, one or more elements of communication system 100 may determine that wireless device 130 is within a coverage area 161 of access node 160, where access node 160 is configured to provide a multi-user multiple-input multiple-output (MU-MIMO) operating mode. It is determined that the first wireless device is within a second coverage area of a second access node that is configured to provide the MU-MIMO operating mode (706). For example, one or more elements of communication system 100 may determine that wireless device 130 is within a coverage area 111 of access node 110, where access node 110 is configured to provide a multi-user multiple-input multiple-output (MU-MIMO) operating mode.

A first number of wireless devices that are attached to the first access node and that are utilizing the MU-MIMO operating mode is determined (708). For example, one or more elements of communication system 100 may determine that a first number of wireless devices 121 attached to access node 160 are utilizing the MU-MIMO operating mode. A second number of wireless devices that are attached to the second access node and that are utilizing the MU-MIMO operating mode is determined (710). For example, one or more elements of communication system 100 may determine that a second number of wireless devices 120 attached to access node 110 are utilizing the MU-MIMO operating mode.

Based on the first number and the second number, the first wireless device is instructed to attach to the second access node (712). For example, based on the number wireless devices 121 attached to access node 160 that are utilizing the MU-MIMO operating mode exceeding the number wireless devices 120 attached to access node 110 that are utilizing the MU-MIMO operating mode, wireless device 130 may be instructed to attach to access node 110.

Figure 8:
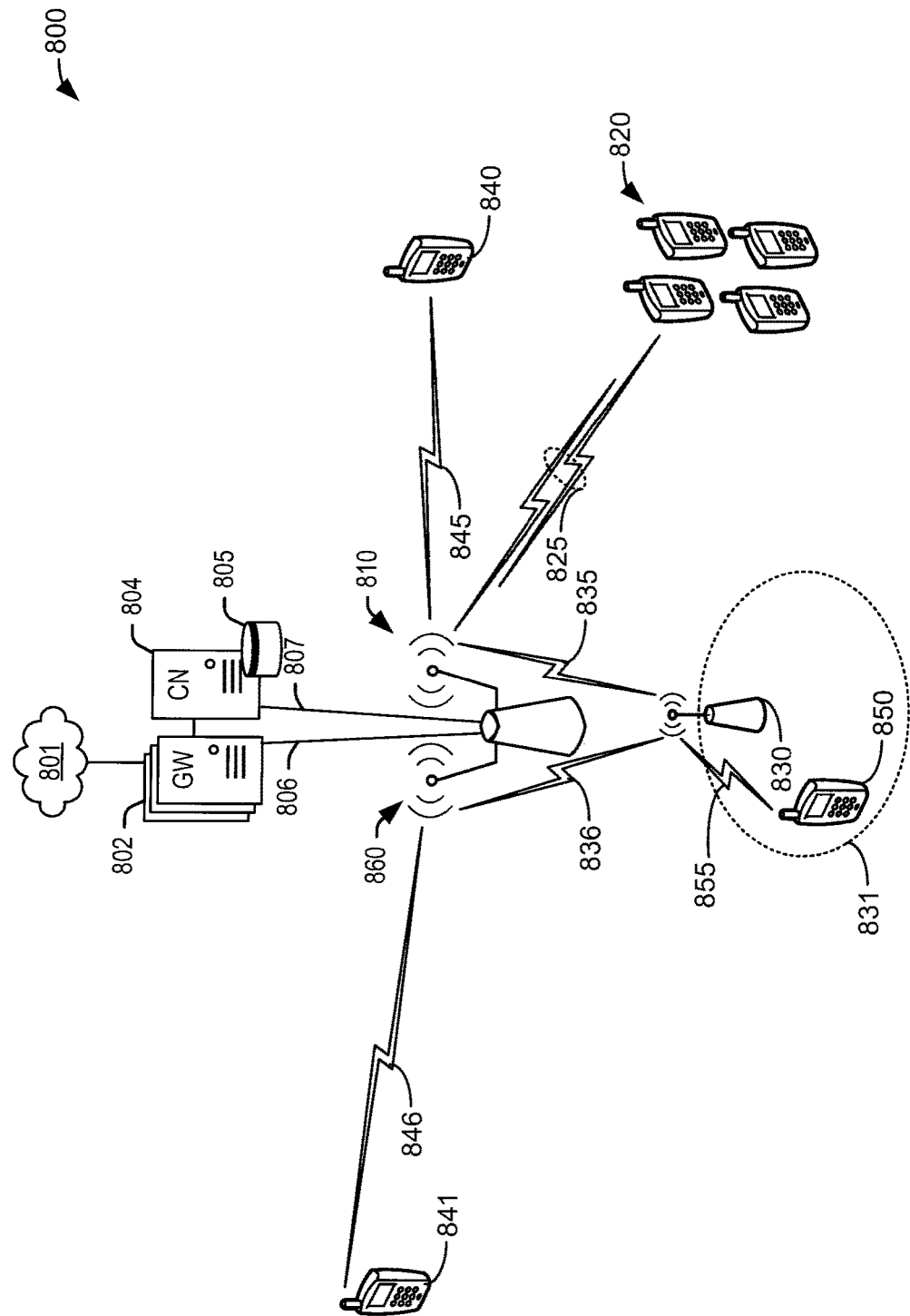
FIG. 8 is a block diagram illustrating a co-located communication system.

FIG. 8 is a block diagram illustrating a co-located communication system. System 800 comprises a communication network 801, gateway node(s) 802, controller node 804, access node 810, access node 860, relay node 830, wireless devices 820, 840, 841, and 850. Access node 860 illustrated as deploying a wireless air interface (e.g., links 836 and 846) for a first type of wireless service. Access node 810 is illustrated as deploying a wireless air interface for a second type of wireless service (e.g., links 825, 835 and 845). In an embodiment, access node 860 and access node 810 may be collocated.

Relay node 830 and wireless devices 820, 840, and 850 are configured and positioned such that relay node 830 and wireless devices 820, 840, and/or 850 may access network services via access node 810. Relay node 830 and wireless device 841 are configured and positioned such that relay node 830 and wireless device 841 may access network services via access node 860.

Relay node 830 may be configured to communicate with access node 810 over communication link 835, (hereinafter, "wireless backhaul" or simply "backhaul"). Relay node 830 may be configured to communicate with access node 860 over communication link 836. Relay node 830 is further configured to deploy additional wireless air interfaces over coverage areas 831. Wireless device 850 is configured to attach to the wireless air interface of relay node 830. Wireless device 850 may access network services from access node 810 (via link 835) or access node 860 (via link 835) by virtue of being connected to relay node 830. Consequently, access nodes 810 and 860 may be termed a "donor" access nodes. In other embodiments, any other combination of wireless devices, donor access nodes, relay access nodes, and carriers deployed therefrom may be evident to those having ordinary skill in the art in light of this disclosure.

In operation, control node 804 (or another entity within system 800) may be configured to execute a method of operating a communication system that includes receiving a first indicator that a first wireless device (e.g., relay node 830) may attach to a first access node (e.g., access node 860) and also may attach to a second access node (e.g., access node 810.) The first access node and the second access node are both configured to provide a multi-user multiple-input multiple-output (MU-MIMO) operating mode. The method further includes determining a first number of wireless devices attached to the first access node that are utilizing the MU-MIMO operating mode (e.g., the number of wireless devices 821 communicating via MU-MIMO links 826.) The method further includes identifying the first wireless device as being configured as a relay node. The method further includes, based on the first number meeting a first threshold (e.g., the number of wireless devices 821 communicating via MU-MIMO links 826 being greater than a selected number—e.g., 10, 20, 30, etc. wireless devices), instructing the first wireless device to attach to the second access node.

In addition, a second number of wireless devices attached to the second access node that are utilizing the MU-MIMO operating mode may be determined (e.g., the number of wireless devices 820 communicating via MU-MIMO links 825.). The first threshold may be determined based on the second number. For example, the first threshold may be equal to the second number; the first threshold may be 120% of the second number; the first threshold may be the second number plus 10 devices, etc.

It may also be determined that the first number of wireless devices attached to the first access node that are utilizing the MU-MIMO operating mode has changed to a third number of wireless devices attached to the first access node that are utilizing the MU-MIMO operating mode. For example, the number of wireless devices 821 utilizing MU-MIMO links 826 may drop (or rise) over time. The third number may not meet the first threshold. For example, the number of wireless devices 821 utilizing MU-MIMO links 826 with access node 860 may drop from being greater than the number of wireless devices 820 utilizing MU-MIMO links 825 with access node 810, to being below the number of wireless devices 820 utilizing MU-MIMO links 825 with access node 810.

Based on the third number not meeting the first threshold, the first wireless device may be instructed to attach to the first access node. For example, in response to the number of wireless devices 821 utilizing MU-MIMO links 826 with access node 860 dropping from being greater than the number of wireless devices 820 utilizing MU-MIMO links 825 with access node 810 to being below the number of wireless devices 820 utilizing MU-MIMO links 825 with access node 810, relay node 830 may be instructed to attach to access node 860.

It may be determined that the second number of wireless devices attached to the second access node that are utilizing the MU-MIMO operating mode has changed to a fourth number of wireless devices attached to the second access node that are utilizing the MU-MIMO operating mode. For example, the number of wireless devices 820 utilizing MU-MIMO links 825 may rise (or drop) over time. The changed number may cause a change in the first threshold. For example, the number of wireless devices 820 utilizing MU-MIMO links 825 with access node 810 may rise from being less than the number of wireless devices 821 utilizing MU-MIMO links 826 with access node 860, to being above the number of wireless devices 821 utilizing MU-MIMO links 826 with access node 860. In response, the first threshold may be determined (or re-determined) based on the changed number of devices 820 utilizing MU-MIMO links 825 with access node 810.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   receiving a first indicator that a first wireless device may attach to a first access node and also may attach to a second access node, the first access node and the second access node configured to provide a multi-user multiple-input multiple-output (MU-MIMO) operating mode;
   determining a first number of end-user wireless devices attached to the first access node that are utilizing the MU-MIMO operating mode;
   identifying the first wireless device as being configured as a relay node;
   determining a second number of end-user wireless devices attached to the second access node that are utilizing the MU-MIMO operating mode;
   determining a first threshold based on the second number, wherein the first threshold is a number of end-user wireless devices attached to the second access node that are utilizing the MU-MIMO operating mode that exceeds the second number;
   based on the first number meeting the first threshold, instructing the first wireless device to attach to the second access node; and
   determining the following:
      that the first number of end-user wireless devices attached to the first access node that are utilizing the MU-MIMO operating mode has changed to a third number of end-user wireless devices attached to the first access node that are utilizing the MU-MIMO operating mode, and
      that the second number of end-user wireless devices attached to the second access node that are utilizing the MU-MIMO operating mode has changed to a fourth number of end-user wireless devices attached to the second access node that are utilizing the MU-MIMO operating mode.

2. The method of claim 1, wherein it is determined that the first number of end-user wireless devices attached to the first access node that are utilizing the MU-MIMO operating mode has changed to a third number of end-user wireless devices attached to the first access node that are utilizing the MU-MIMO operating mode.

3. The method of claim 2, wherein the third number does not meet the first threshold.

4. The method of claim 3, further comprising, based on the third number not meeting the first threshold, instructing the first wireless device to attach to the first access node.

5. The method of claim 2, wherein the third number is greater than the second number.

6. The method of claim 5, wherein the third number is at least 5% greater than the second number.

7. The method of claim 1, wherein it is determined that the second number of end-user wireless devices attached to the second access node that are utilizing the MU-MIMO operating mode has changed to a fourth number of end-user wireless devices attached to the second access node that are utilizing the MU-MIMO operating mode; and,
   based on the fourth number, updating the first threshold.

8. The method of claim 1, wherein the first threshold is 120% of the second number.

9. A system for allocating resources in a wireless network, comprising:
   a processing node; and
   a processor coupled to the processing node, the processor configured to perform operations comprising:
      receiving a first indicator that a first wireless device is within a first coverage area of a first access node;
      receiving a second indicator that the first wireless device is within a second coverage area of a second access node, the first access node and the second access node configured to provide a multi-user multiple-input multiple-output (MU-MIMO) operating mode;
      identifying the first wireless devices as being configured as a relay node;
      determining a first number of end-user wireless devices attached to the first access node that are utilizing the MU-MIMO operating mode;
      determining a second number of end-user wireless devices attached to the second access node that are utilizing the MU-MIMO operating mode;
      instructing the first wireless device to attach to the second access node based on the first number exceeding the second number by at least a first amount; and
      determining the following:
         that the first number of end-user wireless devices attached to the first access node that are utilizing the MU-MIMO operating mode has changed to a third number of end-user wireless devices attached to the first access node that are utilizing the MU-MIMO operating mode, and
         that the second number of end-user wireless devices attached to the second access node that are utilizing the MU-MIMO operating mode has changed to a fourth number of end-user wireless devices attached to the second access node that are utilizing the MU-MIMO operating mode, wherein the fourth number exceeds the first number by at least the first amount.

10. The system of claim 9, wherein the processor determines that the first number of end-user wireless devices attached to the first access node that are utilizing the MU-MIMO operating mode has changed to a third number of end-user wireless devices attached to the first access node that are utilizing the MU-MIMO operating mode.

11. The system of claim 10, wherein the third number does not exceed the second number by the first amount.

12. The system of claim 11, wherein the processor is further configured to perform operations comprising:

based on the third number not exceeding the second number by the first amount, instructing the first wireless device to attach to the first access node.

13. The system of claim 9, wherein the processor: determines that the second number of end-user wireless devices attached to the second access node that are utilizing the MU-MIMO operating mode has changed to a fourth number of end-user wireless devices attached to the second access node that are utilizing the MU-MIMO operating mode, wherein the fourth number exceeds the first number by at least the first amount; and, the fourth number exceeds the first number by at least the first amount, instructing the first wireless device to attach to the first access node.

14. The system of claim 9, wherein the first amount is 5%.

15. The system of claim 9, wherein the first amount is 10%.

16. A processing node for scheduling resources in a wireless network, the processing node being configured to perform operations comprising:
  identifying a first wireless devices as being configured as a relay node;
  determining the first wireless device is within a first coverage area of a first access node configured to provide a multi-user multiple-input multiple-output (MU-MIMO) operating mode;
  determining the first wireless device is within a second coverage area of a second access node configured to provide the MU-MIMO operating mode;
  determining a first number of end-user wireless devices attached to the first access node that are utilizing the MU-MIMO operating mode;
  determining a second number of end-user wireless devices attached to the second access node that are utilizing the MU-MIMO operating mode;
  instructing the first wireless device to attach to the second access node based on the first number exceeding the second number by at least a first amount; and
  determining the following:
    that the first number of end-user wireless devices attached to the first access node that are utilizing the MU-MIMO operating mode has changed to a third number of end-user wireless devices attached to the first access node that are utilizing the MU-MIMO operating mode, wherein the third number exceeds the second number by at least the first amount, and that the second number of end-user wireless devices attached to the second access node that are utilizing the MU-MIMO operating mode has changed to a fourth number of end-user wireless devices attached to the second access node that are utilizing the MU-MIMO operating mode, wherein the fourth number does not exceed the first number by at least the first amount.

17. The processing node of claim 16, wherein the processing: determines that the first number of end-user wireless devices attached to the first access node that are utilizing the MU-MIMO operating mode has changed to a third number of end-user wireless devices attached to the first access node that are utilizing the MU-MIMO operating mode, wherein the third number exceeds the second number by at least the first amount; and, based on the third number exceeding the first number by at least the first amount, instructing the first wireless device to attach to the first access node.

18. The processing node of claim 17, wherein the processing node: determines that the second number of end-user wireless devices attached to the second access node that are utilizing the MU-MIMO operating mode has changed to a fourth number of end-user wireless devices attached to the second access node that are utilizing the MU-MIMO operating mode, wherein the fourth number does not exceed the first number by at least the first amount; and, based on the fourth number not exceeding the first number by at least the first amount, instructing the first wireless device to attach to the first access node.

19. The processing node of claim 16, wherein the first amount is 5%.

20. The processing node of claim 16, wherein the first amount is 10%.

* * * * *